(12) United States Patent
Pulliam et al.

(10) Patent No.: US 12,517,848 B2
(45) Date of Patent: Jan. 6, 2026

(54) METHOD, DEVICE, AND SYSTEM FOR SPATIAL LIGHT MODULATOR CONTROL

(71) Applicant: TEXAS INSTRUMENTS INCORPORATED, Dallas, TX (US)

(72) Inventors: Mohhamad Pulliam, Dallas, TX (US); William C. Wallace, Richardson, TX (US); Thomas Leyrer, Geisenhausen (DE); Akeem Whitehead, Garland, TX (US); Michael A. Hannah, Fairview, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 18/326,839

(22) Filed: May 31, 2023

(65) Prior Publication Data

US 2023/0409497 A1    Dec. 21, 2023

Related U.S. Application Data

(60) Provisional application No. 63/352,554, filed on Jun. 15, 2022.

(51) Int. Cl.
*G06F 13/16* (2006.01)
(52) U.S. Cl.
CPC ...... *G06F 13/1668* (2013.01); *G06F 2213/16* (2013.01)

(58) Field of Classification Search
CPC .......... G06F 13/1668; G06F 2213/16
See application file for complete search history.

(56) References Cited

U.S. PATENT DOCUMENTS

| 8,531,493 | B2 * | 9/2013 | Hui | G09G 3/2022 345/691 |
|---|---|---|---|---|
| 10,970,074 | B2 * | 4/2021 | Leyrer | G06F 9/30098 |
| 11,336,757 | B2 * | 5/2022 | Leyrer | H04L 69/323 |
| 11,592,154 | B2 * | 2/2023 | Dabral | H05B 45/10 |
| 2015/0278133 | A1 * | 10/2015 | Subramanian | G06F 13/28 710/308 |
| 2018/0006101 | A1 * | 1/2018 | Ha | H10K 59/1213 |
| 2019/0372566 | A1 * | 12/2019 | Leyrer | G06F 11/0751 |

* cited by examiner

*Primary Examiner* — Brian T Misiura
(74) *Attorney, Agent, or Firm* — Michael T. Gabrik; Frank D. Cimino

(57) ABSTRACT

A method includes transferring, by a memory controller from non-volatile memory to volatile memory, a bit sequence comprising video data and control information and transferring, by a first programmable real-time unit (PRU) from the volatile memory to a scratchpad register, the bit sequence. The method also includes transferring, by a second PRU from the scratchpad register to a general purpose input output (GPIO) register, the bit sequence, where the GPIO register is adapted to be coupled to a spatial light modulator (SLM).

20 Claims, 7 Drawing Sheets

METHOD, DEVICE, AND SYSTEM FOR SPATIAL LIGHT MODULATOR CONTROL

CROSS-REFERENCE TO RELATED APPLICATION

This application claims priority to U.S. Provisional Patent Application No. 63/352,554, filed on Jun. 15, 2022, and entitled "Implementing a Non-standard Interface by Pre-Calculating Required Interface Commands Associated with Data and Playing Back and Commands from Local Storage," which application is hereby incorporated herein by reference in its entirety.

TECHNICAL FIELD

The present application relates in general to spatial light modulators, and, in particular, to a method, device, and system for spatial light modulator control.

BACKGROUND

In many applications, such as dynamic ground projection, white goods, and industrial applications, it is desirable to have low cost spatial light modulators (SLMs). Some SLMs are controlled by a high cost application specific integrated circuit (ASIC). Some other SLMs are controlled by a field programmable gate array (FPGA) with limited functionality.

SUMMARY

An embodiment method includes transferring, by a memory controller from non-volatile memory to volatile memory, a bit sequence comprising video data and control information and transferring, by a first programmable real-time unit (PRU) from the volatile memory to a scratchpad register, the bit sequence. The method also includes transferring, by a second PRU from the scratchpad register to a general purpose input output (GPIO) register, the bit sequence, where the GPIO register is adapted to be coupled to a spatial light modulator (SLM).

An embodiment method includes obtaining, by a processor, a video frame and pre-processing, by the processor, the video frame to produce a bit sequence, the bit sequence comprising video data, control signals associated with the video data, and clock information associated with the video data and the control signals. The method also includes storing the bit sequence in non-volatile memory.

An embodiment system includes non-volatile memory and volatile memory. The system also includes a memory controller coupled to the non-volatile memory and to the volatile memory, the memory controller configured to transfer a bit sequence from the non-volatile memory to the volatile memory and a spatial light modulator (SLM). Additionally, the system includes scratchpad registers and a first programmable real-time unit (PRU) coupled to the volatile memory and to the scratchpad registers. The first PRU is configured to transfer the bit sequence from the volatile memory to the scratchpad registers. Also, the system includes a general purpose input output (GPIO) register coupled to the SLM and a second PRU. The second PRU is configured to transfer the bit sequence from the scratchpad registers to the GPIO register, wherein the SLM is configured to produce an image based on the bit sequence at the GPIO register.

BRIEF DESCRIPTION OF THE DRAWINGS

For a more complete understanding of the illustrative examples of aspects of the present application that are described herein and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the illustrative example arrangements and are not necessarily drawn to scale.

DETAILED DESCRIPTION

Although the example illustrative arrangements have been described in detail, it should be understood that various changes, substitutions and alterations can be made herein without departing from the spirit and scope of the present application as defined by the appended claims.

Spatial light modulators (SLMs) are used for a variety of projection application. Increasingly, SLMs are used in low cost projection applications, such as vehicle ground projection, white goods, toys, signage, medical ultrasound applications, non-standard data converter interfaces, and industrial applications. Some examples of SLMs include digital micromirror device (DMD), liquid crystal on silicon (LCoS), liquid crystal display (LCD), and micro light emitting diode (LED).

Embodiments describe a system and method of control of an SLM. Video frames are pre-processed to produce bit sequences containing data, control signals, and clock information in forms that are usable by the SLM. The bit sequences are stored in non-volatile memory. During operation, memory controller transfers the bit sequences from the non-volatile memory to volatile memory. Next, in a single clock cycle, a first programmable real-time unit (PRU) transfers the bit sequence from the volatile memory to scratchpad registers. Then, in a single clock cycle, a second PRU transfers the bit sequence from the scratchpad registers to a general purpose input output (GPIO) register which is coupled to GPIO pins. The second PRU also produces at least one SLM clock based on the bit sequences. The SLM is directly coupled to the GPIO pins, and the SLM sets pixel elements based on the values of these GPIO pins using the at least one SLM clock. Embodiments are a low cost but flexible way of operating a SLM to project images. In a ground projection example, an embodiment projector may be placed anywhere on the vehicle in which power is availability, without concerns for cabling. Embodiments enable projection systems with small systems and a small bill of materials. Embodiment projection systems are simple, and therefore reliable. Embodiment projection systems are low cost.

Figure 1A:
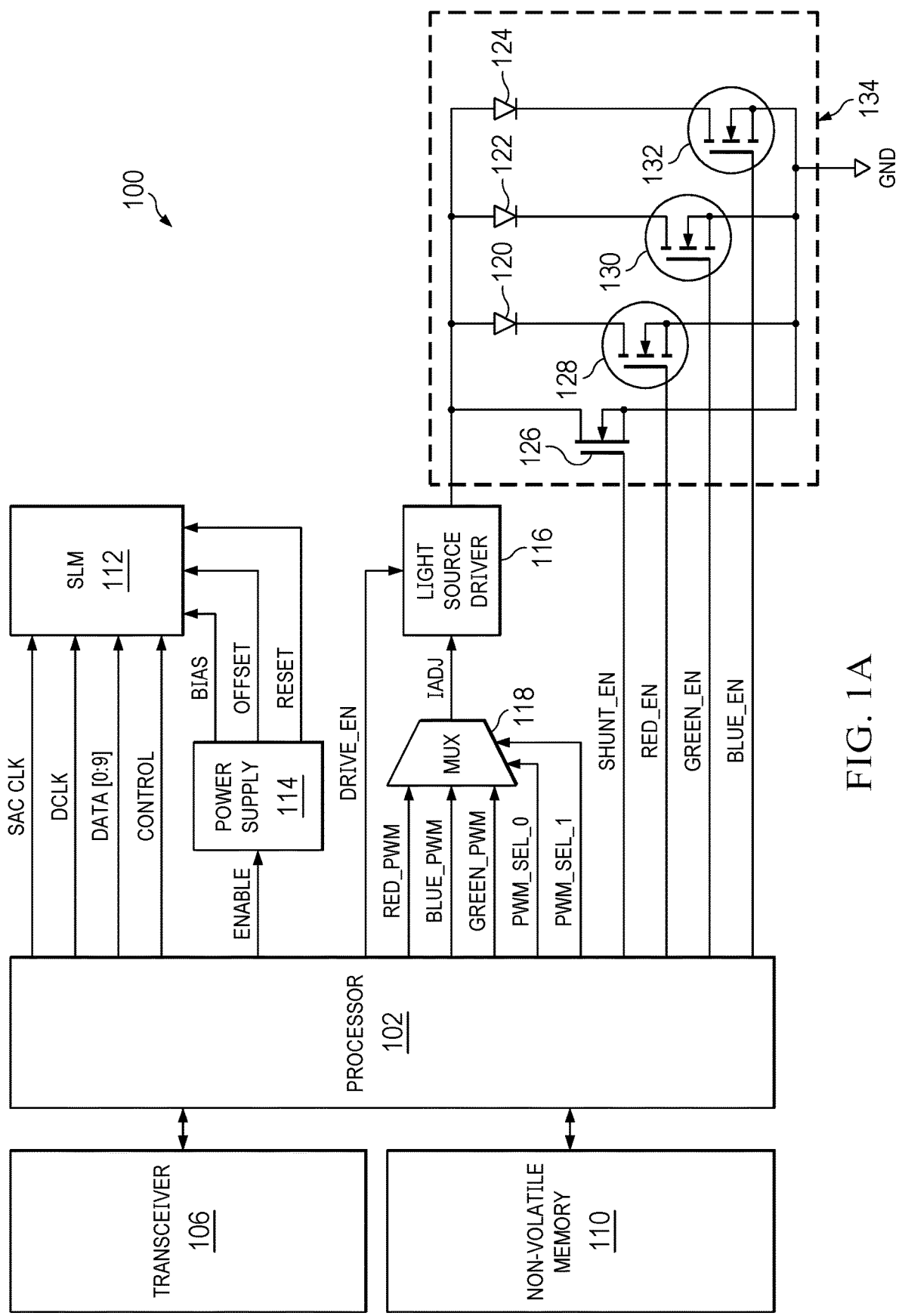
FIG. 1A illustrates an example projection system.
Figure 1B:
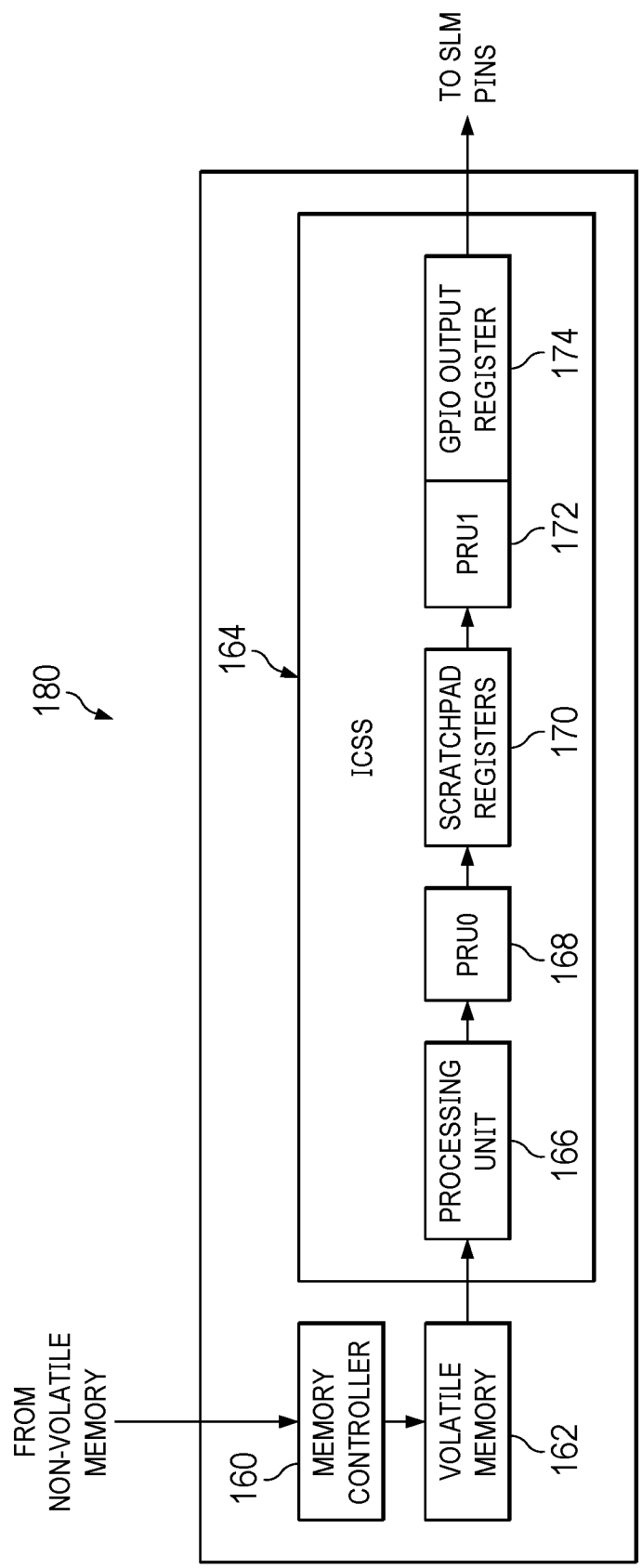
FIG. 1B illustrates an example processor.
Figure 1C:
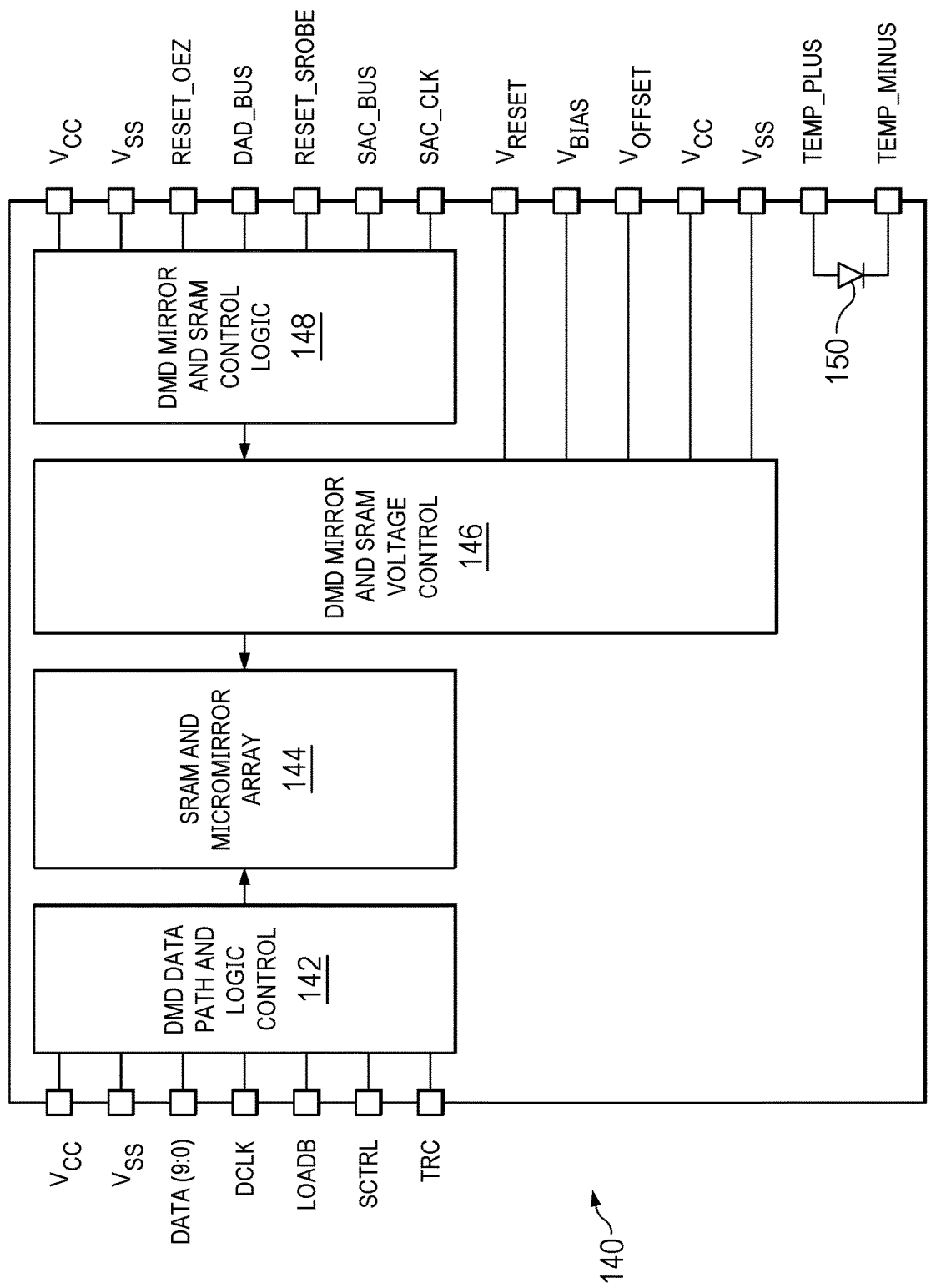
FIG. 1C illustrates an example spatial light modulator (SLM)

FIG. 1A illustrates an example projection system 100, FIG. 1B illustrates an example processor 102, and FIG. 1C illustrates an example SLM 140. The projection system 100 may be a projection system for vehicle ground projection, white goods, an industrial application, or another projection system. In an example, the projection system 100 is a low cost projection system. The projection system 100 contains a processor 102. In an example, the processor 102 is a low cost, off the shelf reduced instruction set computer (RISC) processor having a relatively low clock rate. In an example, the processor 102 is a microcontroller containing two PRUs coupled to a scratchpad register. The processor 102 is coupled to a transceiver 106, to an SLM 112, to a power supply 114, to a multiplexer 118, to a light source driver 116, to a light source 134, and to non-volatile memory 110.

Prior to operation of the projections system 100, the processor 102 receives bit sequences via the transceiver 106, and stores the bit sequences in the non-volatile memory 110. The non-volatile memory 110 may contain flash memory, for example NAND flash memory, NOR flash memory, an octal serial peripheral interface (OSPI), and/or embedded multimedia card (eMMC) flash memory. The transceiver 106 may be a controller area network (CAN) transceiver, an Ethernet physical layer (PHY) transceiver, a universal asynchronous receiver transmitter (UART) transceiver, an inter-integrated circuit (I2C) transceiver, a local interconnect network (LIN) transceiver, an infrared data association (IRDA) transceiver, or another transceiver. The bit sequences contain video data and control information. The control information may include control signals and clock information. The bit sequences are in a format that the SLM can directly use. For example, the bit sequences may contain video data in three bit planes for three different colors and associated control signals and clock information which may be used to produce at least one SLM clock.

When the SLM 112 is operating, the processor 102 transmits an enable signal to the power supply 114, enabling the power supply 114. The power supply 114 transmits bias, offset, and reset signals to the SLM when the power supply 114 is enabled.

The processor 102 contains two PRUs, scratchpad registers, a GPIO register, GPIO pins, a memory controller, a processing unit, and volatile memory. A first PRU enables writing from the volatile memory to the scratchpad registers in a single clock cycle, and the second PRU enables writing from the scratchpad registers to the GPIO pins in a single clock cycle. During operation of the SLM 112, the processor 102 transfers the bit sequence from the non-volatile memory 110 to the volatile memory. Then, the first PRU of the processor 102 transfers the bit sequence from the volatile memory to the scratchpad registers in a single clock cycle. Next, in a single clock cycle, the second PRU of the processor 102 transfers the bit sequences in the scratchpad registers to the GPIO register, and accordingly the GPIO pins. In an example, the first PRU writes the next bit sequence to a scratchpad register of the scratchpad registers during the same clock cycle that the second PRU writes the current bit sequence from a different scratchpad register of the scratchpad registers to the GPIO register. The second PRU of the processor 102 constructs the data clock (DCLK) based on the clock information in the bit stream, places the DCLK on a pin of the GPIO pins which is coupled to the SLM 112. The second PRU of the processor 102 also sets GPIO pins for data based on the video data in the bit stream. In an example, the processor sets 10 input/output (I/O) pins, labeled 0 through 9, to bit values representing video data. The data input pins of the SLM 112 are coupled to these GPIO pins, and the SLM 112 receives the data directly from the GPIO pins. The second PRU of the processor 102 also produces a control signal at a pin of the GPIO pins based on the control signal in the bit streams. The SLM 112 has a control input pin coupled to a GPIO pin of the GPIO pins which contains the control signal, and the SLM 112 directly receives the control signal from the GPIO pin.

The SLM 112 sets the pixels to values based on the data received from the processor 102, using the clock and the control signals. In an example, the SLM 112 is a DMD containing an array of cells, in which a cell contains a mirror and a static random access memory (SRAM) cell beneath the mirror. The SLM 112 loads the data into the SRAM for a portion of cells. The control signals include a bit to load data on the SLM 112, a bit to instruct the SLM 112 to act on the loaded data, a bit instructing pixels of the SLM 112 to have a pixel state transition, a bit to instruct the SLM 112 to act on the pixel state transition, and a bit to switch voltages of electrodes associated with the mirrors.

The processor 102 also controls the light source 134 using the multiplexer 118, the light source driver 116, and direct connections. The light source 134 contains an LED 120, an LED 122, and an LED 124. In an example, the LED 120 is a red LED, the LED 122 is a green LED, and the LED 124 is a blue LED. A transistor 128 is coupled in series with the LED 120, a transistor 130 is coupled in series with the LED 122, and a transistor 132 is coupled in series with the LED 124. Additionally, a transistor 126 is coupled to the LED 120, to the LED 122, and to the LED 124. The processor 102 produces a first pulse width modulation (PWM) signal, a second PWM signal, and a third PWM signal, which are transmitted to inputs of the multiplexer 118. In an example, the first PWM signal is a red PWM signal, the second PWM signal is a blue PWM signal, and the third PWM signal is a green PWM signal. The 102 also produces a first PWM select signal (PWM SEL 0) and a second PWM select signal (PWM SEL 1) which are transmitted to control inputs of the multiplexer 118. The first PWM select signal and the second PWM signal cause the multiplexer 118 to select one of the first PWM signal, the second PWM signal, and the third PWM signal. The processor also produces a shunt enable signal (SHUNT EN) for a control terminal of the transistor 126, a first color enable signal (RED EN) for the control terminal of the transistor 128, a second color enable signal (GREEN EN) for the control terminal of the transistor 130, and a third color enable signal (BLUE EN) for the control terminal of the transistor 132. In an example, the first color is red, the second color is green, and the third color is blue. The processor 102 coordinates the illumination of the LED 120, the LED 122, and the LED 124 with the data displayed by the SLM 112. For example, during a first period of time, the SLM 112 sets its pixels based on a first color bit plane and illuminates the LED 120 based on a first color enable signal and a first PWM signal. Then, the SLM 112 sets its pixels based on a second color bit plane and illuminates the LED 122 based on the second color enable signal and the second PWM signal. Then, the SLM 112 sets its pixels based on a second color bit plane and illuminates the LED 124 based on the third color enable signal and the third PWM signal. Then, the SLM 112 returns to another bit plane for the first color. This sequence repeats for all of the bit planes for a video image. Then, the projection system 100 repeats this sequence for the next video image.

FIG. 1B illustrates an example processor 180, which may be an example of the processor 102 illustrated in FIG. 1A. In an example, the processor 180 has an extremely low latency and zero jitter. The processor 180 contains volatile memory 162 coupled to a memory controller 160 and to an industrial communication sub-system (ICSS) 164. The memory controller 160 receives a bit sequence from non-volatile memory, such as the non-volatile memory 110 illustrated in FIG. 1A. The memory controller 160 stores the bit sequence in the volatile memory 162, which may be random access memory (RAM). In an example (not pictured) a processing unit such as a direct memory access (DMA) or a central processing unit (CPU) is coupled between the memory controller 160 and the volatile memory 162 to process the bit sequence before storing it in the volatile memory 162.

The ICSS is coupled to the volatile memory 162. The ICSS includes a processing unit 166, a PRU 168, scratchpad registers 170, a PRU 172, and a general purpose input output (GPIO) output register 174 which is coupled to GPIO pins. The processing unit 166 may be a DMA or a CPU. The processing unit 166 reads a bit sequence from the volatile memory 162 and transmits the bit sequence to the PRU 168. The processing unit 166 takes a block of data from the volatile memory 162 and transfers the block of data into a first-in-first-out (FIFO). In an example, the block of data is 32 bytes or 64 bytes. The PRU 168 receives the bit sequence from the FIFO of the processing unit 166, formats the bit sequence, and stores the formatted bit sequence in the scratchpad registers 170. In an example, the PRU 168 uses an XIN command to transfer the bit sequence from the volatile memory 162 to the scratchpad registers 170. In an example, the scratchpad registers 170 include three scratchpad registers. The PRU 168 writes to a complete scratchpad register of the scratchpad registers 170 in a single clock cycle. In an example, the PRU 168 is a simple, low latency processor, for example a reduced instruction set computer (RISC) processor. The PRU 172 also produces at least one SLM clock based on clock information stored in the scratchpad registers 170. In an example, the PRU 172 uses an AND command and an OR command to produce at least one SLM clock at the GPIO output register 174 and at GPIO pins of the processor 180 based on clock information stored in the scratchpad registers 170 in a single clock cycle. The PRU 172 may produce both a first SLM clock, for example DCLK and a second SLM clock, for example SAC CLK. SLM pins of the SLM 112 are directly coupled to the GPIO pins of the processor 180. When the SLM clock is produced, the SLM 112 receives the video data and the command signals from at the SLM pins. The SLM 112 then sets pixel elements based on the video data, the command signals, and the at least one SLM clock.

The PRU 172 is an I/O engine which takes the sequence from the scratchpad registers 170 and in a single clock cycle writes the bit sequence to the GPIO output register 174, and accordingly to GPIO pins. The PRU 172 reads from a complete scratchpad register of the scratchpad registers 170 in a single clock cycle. In an example, the PRU 172 the PRU 172 uses a MOV command to transfer the bit sequence from the scratchpad registers 170 to the GPIO output register 174. In an example, the PRU 172 is a simple, low latency RISC processor with a high I/O capacity. The GPIO output register is coupled to GPIO pins which are directly coupled to pins of an SLM, for example the SLM 112 illustrated in FIG. 1A. The SLM 112 may directly use the bit sequence received at the SLM pins. The PRU 172 updates the GPIO output register 174 every clock cycle with a different bit sequence. In an example, the scratchpad registers 170 have three slots, and one slot can be written to in the same clock cycle that another slot is read from. For example, during a first clock cycle, the PRU 168 writes a second bit sequence to a second scratchpad register of the scratchpad registers 170 while the PRU 172 reads a first bit sequence from a first scratchpad register of the scratchpad registers 170. Then, during a second clock cycle, the PRU 168 writes a third bit sequence to a third scratchpad register of the scratchpad registers 170 while the PRU 172 reads the second bit sequence from the second scratchpad register of the scratchpad registers.

FIG. 1C illustrates an example SLM 140. The SLM 140 may be an example of the SLM 112 illustrated in FIG. 1A. The SLM 140 is a DMD. The SLM 140 contains an SRAM and micromirror array 144 coupled to DMD data path and logic control 142 and to DMD mirror and SRAM voltage control 146. The SLM 140 also includes a DMD mirror and SRAM control logic 148 coupled to the DMD mirror and SRAM voltage control 146. Additionally, the SLM 140 contains a temperature sensor 150. In an example, the SRAM and micromirror array 144 is a micromirror array with an SRAM cell beneath each micromirror. The SRAM and micromirror array may have a 16:9 aspect ratio.

The DMD data path and logic control 142 receives a first voltage ($V_{CC}$), a second voltage ($V_{SS}$), ten bits of data (DATA(9:0)), a data clock (DCLK), a command to load data on the SRAM and micromirror array 144 (SCTRL), a command to instruct the SRAM and micromirror array 144 to act on the SCTRL command (LOADB), and an input data toggle rate control (TRC). The DMD data path and logic control 142 loads received data on the SRAM cells of the SRAM and micromirror array 144 upon receiving an SCTRL command. Then, upon receiving a LOADB command, the DMD data path and logic control instructs the SRAM and micromirror array 144 to act on the SCTRL signal. The SCTRL signal may indicate for the DMD to load data or to ignore data and clear the DMD.

The DMD mirror and SRAM control logic 148 receives the logic supply voltage ($V_{CC}$), the supply voltage ($V_{SS}$), a first reset signal (RESET OEZ) to reset the DMD, a signal which instructs the micromirrors when to transition voltages (DAD BUS), a second reset signal (RESET STROBE) which instructs the DMD to apply the DAD BUS signal, a signal which instructs the SRAM and micromirror array 144 to switch the electrode voltages (SAC BUS), and a second clock for the SAC BUS (SAC CLK). The DAD BUS instructs the micromirrors to transition voltages based on the values in the corresponding SRAM cells, and the RESET STROBE triggers the DMD to act on the DAD BUS signal. For example, the DAD BUS sends an instruction to change a voltage, and the DMD holds that instruction state. Then, the RESET STROBE triggers the DMD to change the voltage based on the instruction state. The SAC BUS signal instructs the electrodes of the micromirrors to switch voltages, and The SAC CLK is the clock for the SAC BUS signal.

The DMD mirror and SRAM voltage control 146 controls the DMD mirrors and SRAM of the SRAM and micromirror array 144 based on the output from the DMD mirror and SRAM control logic 148. The DMD mirror and SRAM voltage control 146 also receives mirror electrode voltages ($V_{RESET}$ and $V_{BIAS}$), a mirror electrode voltage ($V_{OFFSET}$), a logic supply voltage ($V_{CC}$) and a supply voltage ($V_{SS}$).

Figure 2:
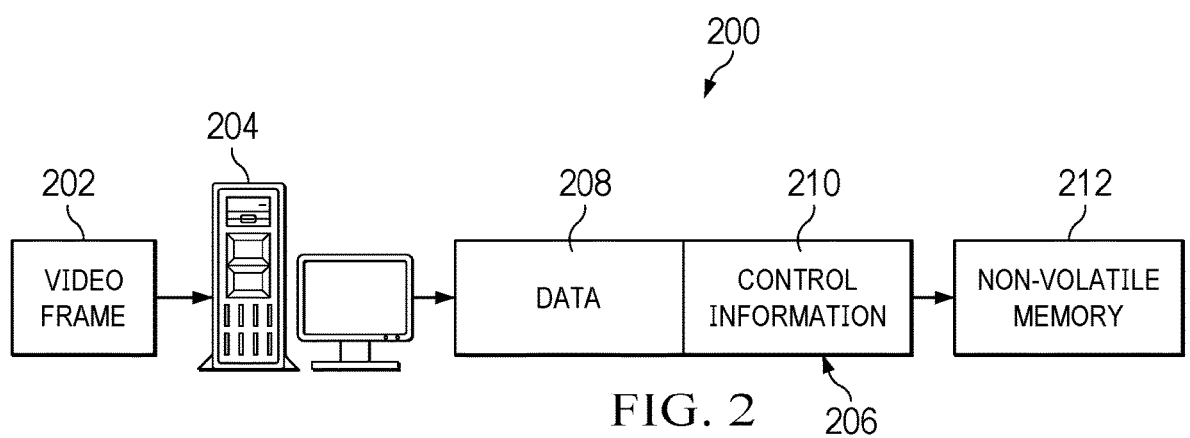
FIG. 2 illustrates an example flow for pre-processing video frames.

FIG. 2 illustrates an example flow 200 for pre-processing video frames. The flow 200 includes a video pre-processor 204 which converts a video frame 202 to a bit sequence 206 and stores the bit sequence 206 in non-volatile memory 212. In an example, the video pre-processor 204 is a desktop computer. In an example, the non-volatile memory 212 is flash memory. The non-volatile memory 212 may be an example of the non-volatile memory 110 illustrated by FIG. 1. The video preprocessor obtains the video frame 202 to be displayed by an SLM, such as the SLM 112 illustrated in FIG. 1, at a later time. The video pre-processor 204 converts the video frame 202 to a bit sequence 206, which is in a form that is directly usable by the SLM 112.

The bit sequence 206 contains data 208 and control information 210. The control information 210 contains control signals and clock information. In an example, the bit sequence 206 contains information from a bit plane. In an example, three bit sequences 206 are produced for each bit of video frame 202 for each color. In an example, the colors are red, green, and blue. A bit plane contains the value for the video frame 202 for a particular bit position. In an example, the SLM 112 displays images one bit plane at a time in a time system. The human visual system averages the bit planes to view the image. For example, the SLM 112 will set the pixels based on a bit plane for the least significant bit and the light source 134 will be illuminated for a short amount of time, then the SLM 112 will set the pixels based on the second least significant bit and the light source 134 will be illuminated for double the time that it was illuminated for the least significant bit, and so on. The SLM 112 may display the bit planes in any order, with a longer illumination for more significant bits. The control information 210 is associated with the data 208. In an example, the data 208 for a color for a bit plane is associated with the control information 210 for the same color and the same bit plane. The video pre-processor 204 produces the control information 210 based on the video frame 202. The control information 210 contains control signals and clock information. In an example, control signals include a bit to load data on the SLM 112, a bit to instruct the SLM 112 to act on the loaded data, a bit instructing pixels of the SLM 112 to have a pixel state transition, a bit to instruct the SLM 112 to act on the pixel state transition, and a bit to switch voltages of electrodes associated with the mirrors. In an example, the clock information includes a data clock and a control clock. The video pre-processor 204 determines the control signals data on the received video frame. The video pre-processor separates a frame of video is separated into R, G, and B components. Then, the RGB sub-frame is converted to multiple bit planes.

Figure 3:
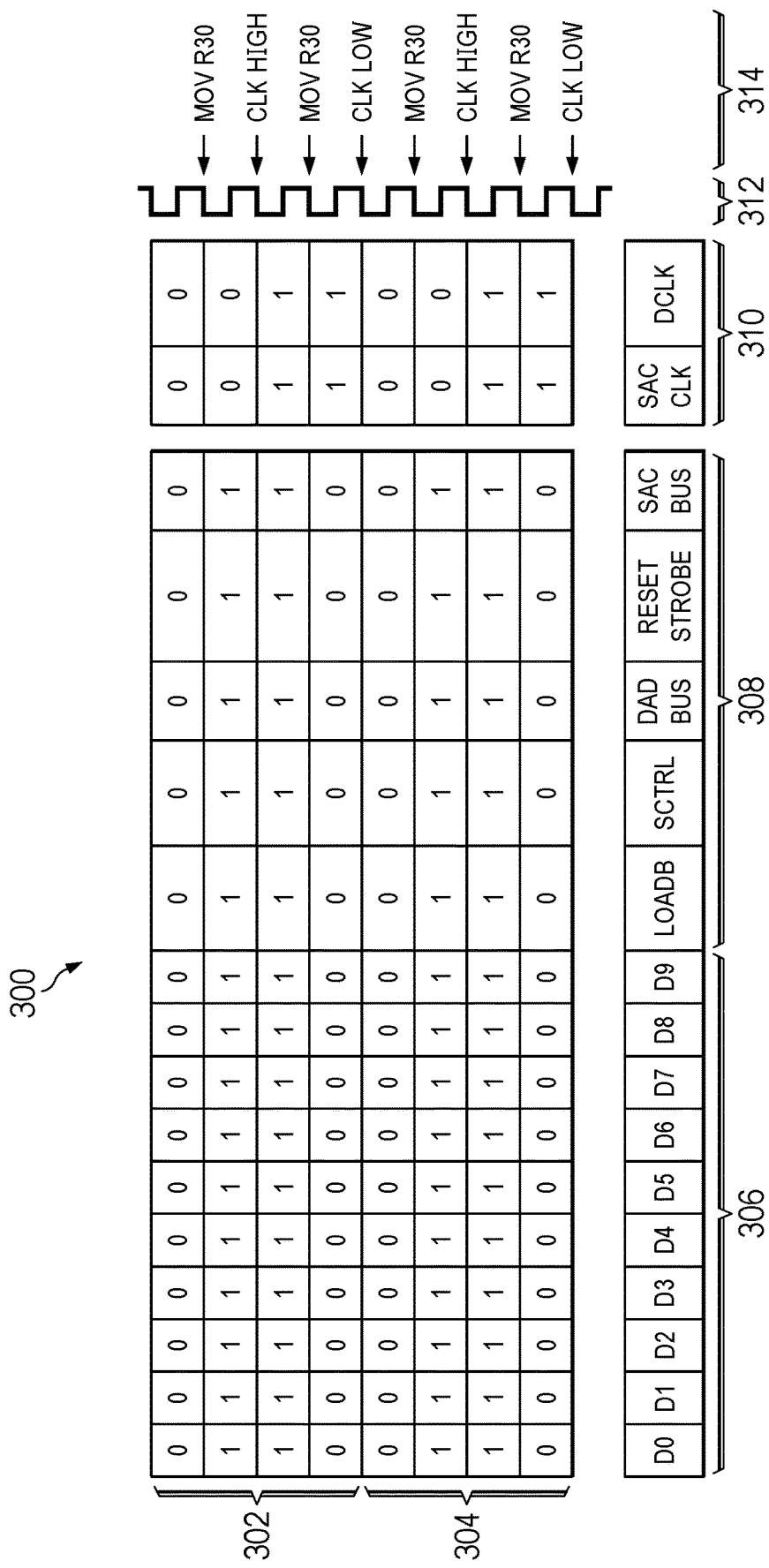
FIG. 3 illustrates example bit sequences.

FIG. 3 illustrates example bit sequences 300. The bit sequence 300 contains information from a first SLM clock period 302 and information from a second SLM clock period 304. The bit sequence 300 includes data 306, control signals 308, and clock information 310. The bit sequence 300 also illustrates the PRU clock 312 and actions 314. In an example, a PRU, for example the PRU 168 illustrated in FIG. 1B, transfers the bit sequence 300 from the volatile memory 162 to the scratchpad registers 170 in 64 byte chunks. In an example, another PRU, for example the PRU 172 illustrated in FIG. 1B uses a move instruction to transfer data from the scratchpad registers 170 to the GPIO output register 174. Also, the PRU 172 uses AND and OR instructions to set the SLM clock state. In the bit sequence 300, time goes down. In an example, the PRU clock 312 is faster than the SLM clock. The PRU clock 312 indicates the clock for the PRU 168 and for the PRU 172. In an example, control signals 308 include a bit to load data on the SLM 112 (SCTRL), a bit to instruct the SLM 112 to act on the loaded data (LoadB), a bit instructing pixels of the SLM 112 to have a pixel state transition (DAD BUS), a bit to instruct the SLM 112 to act on the pixel state transition (RESET STROBE), and a bit to switch voltages of electrodes associated with the mirrors (SAC BUS). In an example, the clock information includes a first SLM clock (DCLK) which loads the data 306 and most of the control signals 308, including a bit to load data on the SLM 112 (SCTRL), a bit to instruct the SLM 112 to act on the loaded data (LoadB), a bit instructing pixels of the SLM 112 to have a pixel state transition (DAD BUS), and a bit to instruct the SLM 112 to act on the pixel state transition. The clock information also includes a second SLM clock (SAC CLK) for the control signal to switch the electrode voltage (SAC BUS). In the illustrated example, the first SLM clock and the second SLM clock are illustrated as having the same clock rate.

On the first rising edge of the PRU clock 312, the PRU 172 performs a move command to transfer a first portion of the data 306 and the control signals 308 to the GPIO pins of the processor 180. In an example, the PRU 172 moves the first two rows of the data 306 and the control signals 308. At the next rising edge of the PRU clock 312, the PRU 172 sets the GPIO state high by loading a predefined bit pattern to the GPIO pins connected to DCLK and SAC CLK, based on the transition from 0 to 1 in the clock information 310. In an example, the bit pattern for a clock low is loaded by doing an OR of the register with a hexadecimal value 0x3 and is set high by doing an AND with a hexadecimal value 0xFC. The SLM 112 has I/O pins coupled to the GPIO pins of the processor 180 to receive the data and the control signals when the first SLM clock and the second SLM clock have the rising edge. In an example, the SLM 112 acts on both the rising edge and the falling edge of the clock. Then, at the next PRU clock 312 rising edge, the PRU 172 performs another move operation to transition the next two rows of the data 306 and the control signals 308 to the GPIO pins of the processor 180. At the next rising edge of the PRU clock 312, the PRU 172 causes the first SLM clock and the second SLM clock to have a falling edge, based on the transition from 1 to 0 in the clock information 310, for the DCLK and SAC CLK, respectively, completing the first SLM clock period 302.

The second SLM clock period 304 is similar to the first SLM clock period 302. On the next rising edge of the PRU clock 312, the PRU 172 performs a move command to transfer a first portion of the data 306 and the control signals 308 to the GPIO pins of the processor 180. In an example, the PRU 172 moves the first two rows of the data 306 and the control signals 308. At the next rising edge of the PRU clock 312, the PRU 172 causes the first SLM clock and the second SLM clock to have a rising edge, based on the transition from 0 to 1 in the clock information 310 for the DCLK and SAC CLK, respectively. The SLM 112 receives the data and the control signals at the SLM I/O pins which are coupled to the GPIO pins of the processor 180, when the first SLM clock and the second SLM clock have the rising edge. Then, at the next PRU clock 312 rising edge, the PRU 172 performs another move operation to transition the next two rows of the data 306 and the control signals 308 to the GPIO pins. At the next rising edge of the PRU clock 312, the PRU 172 causes the first SLM clock (DCLK) and the second SLM clock (SAC CLK) to have a falling edge, based on the transition from 1 to 0 in the clock information 310, completing the second SLM clock period 304.

Figure 4:
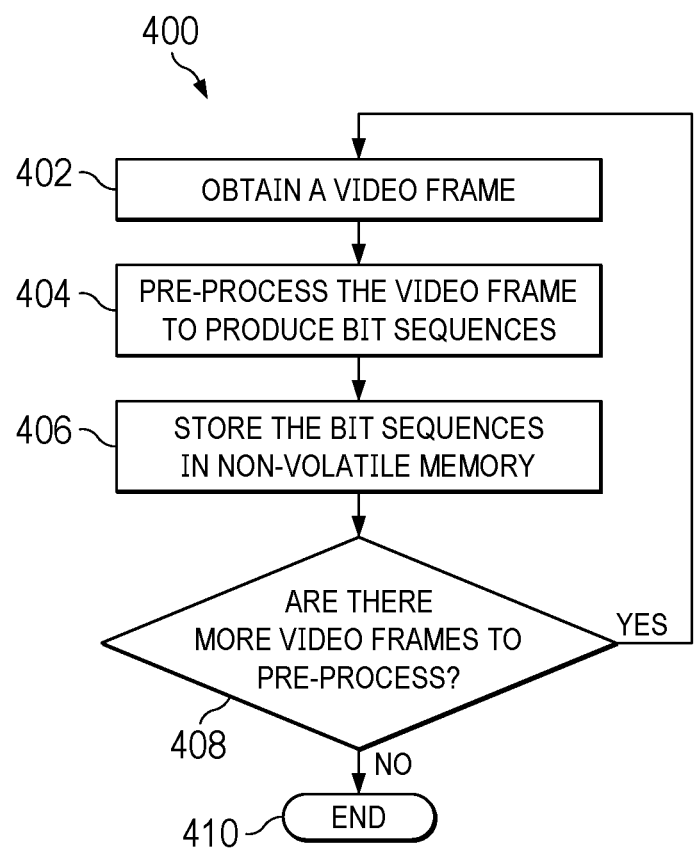
FIG. 4 illustrates a flowchart of an example method of pre-processing video frames.

FIG. 4 illustrates a flowchart 400 of an example method of pre-processing video frames. Initially, in step 402, a video pre-processor, such as the pre-processor 204 illustrated in FIG. 2, obtains a video frame. The video pre-processor may be a desktop computer, a remote server, a tablet, or a cellular phone. In an example, the obtained video frame contains three color values for each pixel. For example, the video frame may be in RGB format or YCbCr format.

Next, in the step 404, the video pre-processor pre-processes the video frame obtained in step 402 to produce bit sequence(s). In an example, the bit sequence is the bit sequence 300, illustrated in FIG. 3. The bit sequence is in a form that the SLM 112 uses directly. The bit sequences include video data and control information. The control information contains control signals and clock information. There may be a bit sequence for each bit plane for each of three colors, red, green, and blue. The control information and the video data for each bit plane for each color are packaged together. The video pre-processor 204 determines the pixel display timing, including the control signals and clock information, based on the received video frame. The data is packaged with the control information based on bit plane and color.

After the video pre-processor 204 pre-processes the video frame, in step 406, the video pre-processor 204 stores the bit sequence(s) in non-volatile memory, for example the non-volatile memory 212 illustrated in FIG. 2 or the non-volatile memory 110 illustrated in FIG. 1. The non-volatile memory may be flash memory. The bit sequence(s) can be used at a later time for display of the video frame by an SLM, such as the SLM 112 illustrated in FIG. 1.

After storing the bit sequence(s) in the non-volatile memory, the video pre-processor 204 proceeds to step 408. In the step 408, the video pre-processor determines whether there are more video frames to pre-process. When there are more video frames to pre-process, the video pre-processor 204 returns to the step 402 to obtain another video frame. When there are not more video frames to pre-process, the video pre-processor proceeds to step 410 and ends the flowchart 400.

Figure 5:
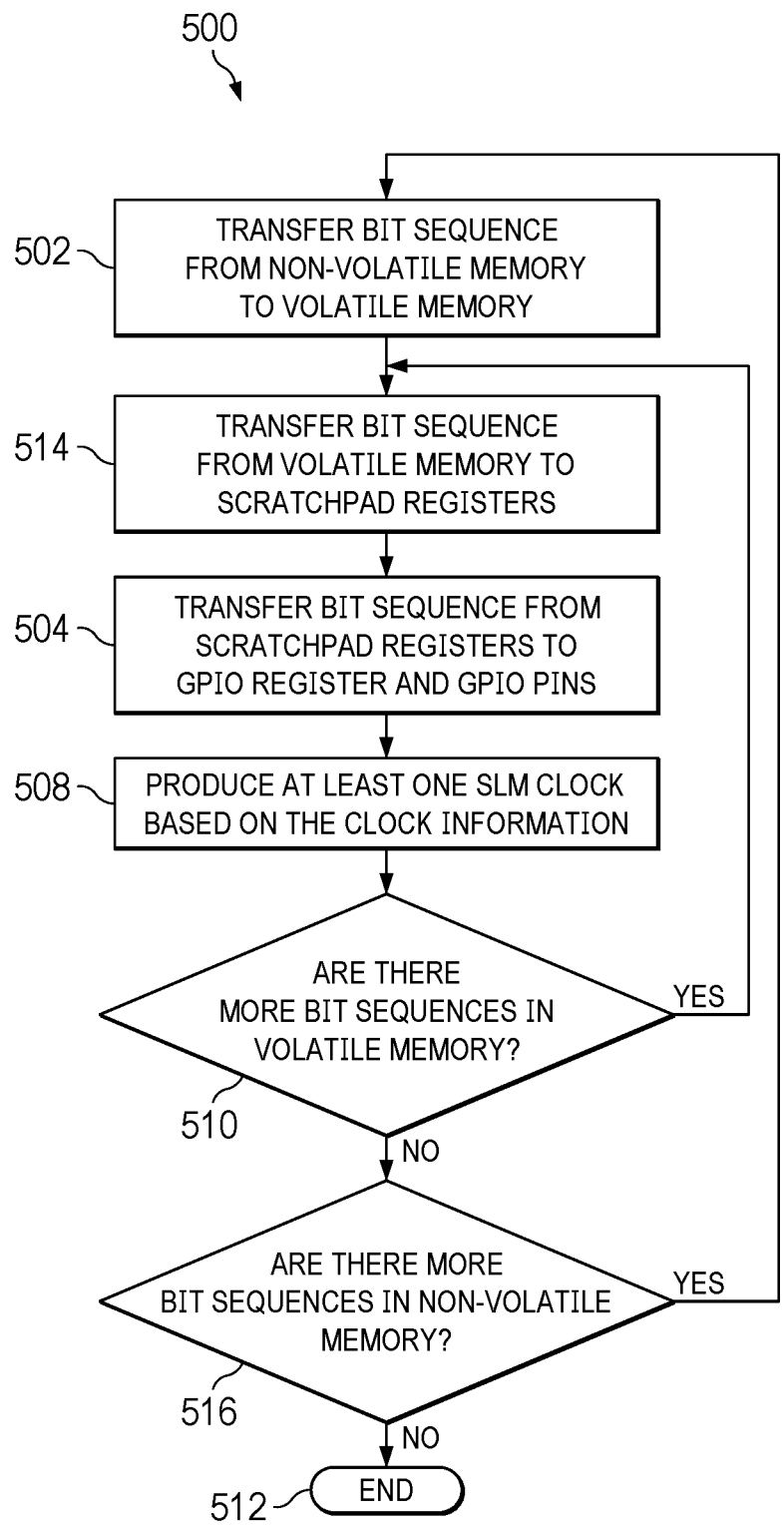
FIG. 5 illustrates a flowchart of an example method of processing bit sequences for an SLM.

FIG. 5 illustrates a flowchart 500 of an example method of processing bit sequences for an SLM. Initially, in a step 502, a memory controller, such as the memory controller 160 illustrated in FIG. 1B, transfers a bit sequence from non-volatile memory, for example the non-volatile memory 110 illustrated in FIG. 1A, to volatile memory, for example the volatile memory 162 illustrated in FIG. 1B. In an example, the processor is the processor 102 illustrated in FIG. 1A or the processor 180 illustrated in FIG. 1B and the bit sequence is the bit sequence 300 illustrated in FIG. 3. The processor 180 includes at least two PRUs, the PRU 168 and the PRU 172. In an example, the bit sequence includes video data and control information, and the control information contains control signals and clock information.

Next, in step 514 the processor transfers the bit sequence from volatile memory to scratchpad registers. In an example, the PRU 168 transfers the bit sequence from the volatile memory 162 to a scratchpad register of the scratchpad registers 170. In an example, the PRU 168 uses an XIN command to transfer the bit sequence from the volatile memory 162 to the scratchpad registers 170. The PRU 168 transfers the bit sequence from the volatile memory 162 to the scratchpad registers 170 in a single clock cycle.

After the bit sequence has been transferred from volatile memory 162 to the scratchpad registers 170, in step 504 the processor transfers the bit sequence from the scratchpad registers to a GPIO output register and GPIO pins. In an example, the PRU 172 transfers the bit sequence from a scratchpad register of the scratchpad registers to the GPIO output register 174 and to GPIO pins of the processor 180 in a single clock cycle. In an example, the processor 102 uses a MOV command to transfer the bit sequence from the register to the I/O pins in a single clock cycle. In an example, during a first clock cycle, the PRU 172 transfers a first bit sequence from a first scratchpad register of the scratchpad registers 170 to the GPIO output register 174 while the PRU 168 transfers a second bit sequence from the volatile memory 162 to a second scratchpad register of the scratchpad registers 170. Then, during a second clock cycle, the PRU 172 transfers the second bit sequence from the second scratchpad register of the scratchpad registers while the PRU 168 transfers a third bit sequence from the volatile memory 162 to a third scratchpad register of the scratchpad registers 170.

In step 508, the processor produces at least one SLM clock based on clock information in the scratchpad register. In an example, the PRU 172 uses an AND command and an OR command to produce at least one SLM clock at the GPIO output register 174 and at GPIO pins of the processor 180 based on clock information stored in the scratchpad registers 170 in a single clock cycle. The PRU 172 may produce both a first SLM clock, for example DCLK and a second SLM clock, for example SAC CLK. SLM pins of the SLM 112 are directly coupled to the GPIO pins of the processor 180. When the SLM clock is produced, the SLM 112 receives the video data and the command signals from at the SLM pins. The SLM 112 then sets pixel elements based on the video data, the command signals, and the at least one SLM clock.

In step 510, the processor determines whether there are more bit sequences in the volatile memory, for example the volatile memory 162. When there are more bit sequences in the volatile memory, the processor proceeds to step 504 to transfer another bit sequence from the volatile memory 162 to the scratchpad registers 170. When there are not more bit sequences in the volatile memory, the processor proceeds to step 516.

In step 516, the processor determines whether there are more bit sequences in non-volatile memory, for example the non-volatile memory 110. When there are more bit sequences in non-volatile memory, the processor returns to the step 502 to transfer the next bit sequence from non-volatile memory 110 to volatile memory 162. When there are not more bit sequences in non-volatile memory, the processor proceeds to step 512 and ends the flowchart 500.

Moreover, the scope of the present application is not intended to be limited to the particular illustrative example arrangement of the process, machine, manufacture, and composition of matter means, methods and steps described in this specification. As one of ordinary skill in the art will readily appreciate from the disclosure, processes, machines, manufacture, compositions of matter, means, methods or steps, presently existing or later to be developed, that perform substantially the same function or achieve substantially the same result as the corresponding example arrangements described herein may be utilized according to the illustrative arrangements presented and alternative arrangements described, suggested or disclosed. Accordingly, the appended claims are intended to include within their scope such processes, machines, manufacture, compositions of matter, means, methods, or steps.

What is claimed is:

1. A method comprising:
transferring, by a memory controller from non-volatile memory to volatile memory, a first bit sequence;
transferring, by a first programmable real-time unit (PRU) from the volatile memory to a first scratchpad register, the first bit sequence;
transferring, by a second PRU from the first scratchpad register to a general purpose input output (GPIO) register, the first bit sequence, wherein the GPIO register is adapted to be coupled to a spatial light modulator (SLM); and
transferring, by the first PRU from the volatile memory to a second scratchpad register, a second bit sequence during the same clock cycle as transferring, by the second PRU, the first bit sequence from the first scratchpad register to the GPIO register.

2. The method of claim 1, wherein transferring the first bit sequence from the first scratchpad register to the GPIO register occurs in a single clock cycle.

3. The method of claim 1, wherein the video data is a bit plane.

4. The method of claim 1, wherein the first bit sequence comprises video data and control information.

5. The method of claim 4, wherein the control information comprises control signals and clock information, the method further comprising producing, by the second PRU, an SLM clock responsive to the clock information.

6. The method of claim 5, wherein the clock information comprises a first SLM clock and a second SLM clock, the first SLM clock for clocking the video data and a first portion of the control information and the second SLM clock for clocking a second portion of the control information.

7. The method of claim 5, wherein the control signals comprises a first bit to load data on the SLM, a second bit instructing the SLM to act on the loaded data, a third bit instructing pixels of the SLM to have a pixel state transition, a fourth bit instructing the SLM to act on the pixel state transition.

8. The method of claim 7, wherein the SLM is a digital micromirror device (DMD) comprising mirrors, and wherein the control information comprises a fifth bit to switch voltages of electrodes associated with the mirrors.

9. A system comprising:
   non-volatile memory;
   volatile memory;
   a memory controller coupled to the non-volatile memory and to the volatile memory, the memory controller configurable to transfer a bit sequence from the non-volatile memory to the volatile memory, in which the bit sequence comprises control information and clock information;
   a spatial light modulator (SLM);
   scratchpad registers;
   a first programmable real-time unit (PRU) coupled to the volatile memory and to the scratchpad registers, the first PRU configurable to transfer the bit sequence from the volatile memory to the scratchpad registers;
   a general purpose input output (GPIO) register coupled to the SLM; and
   a second PRU configurable to transfer the bit sequence from the scratchpad registers to the GPIO register, wherein the SLM is configurable to receive the bit sequence from the GPIO register and produce an image responsive to the bit sequence at the GPIO register.

10. The system of claim 9, wherein the bit sequence further comprises video data.

11. The system of claim 10, wherein the clock information comprises a first clock and a second clock, the first clock for clocking the video data and a first portion of the control information and the second clock for clocking a second portion of the control information.

12. The system of claim 11, wherein the control information comprises a first bit to load data on the SLM, a second bit instructing the SLM to act on the loaded data, a third bit instructing pixels of the SLM to have a pixel state transition, a fourth bit instructing the SLM to act on the pixel state transition.

13. The system of claim 12, wherein the SLM is a digital micromirror device (DMD) comprising mirrors, and wherein the control information comprises a fifth bit to switch voltages of electrodes associated with the mirrors.

14. The system of claim 9, wherein the bit sequence is a bit plane.

15. The system of claim 9, wherein transferring the bit sequence from the scratchpad registers to the GPIO register occurs in a single clock cycle.

16. The system of claim 9, wherein the bit sequence is a first bit sequence and the scratchpad registers comprise a first scratchpad register and a second scratchpad register, the first PRU further configurable to transfer from the volatile memory to the second scratchpad register, a second bit sequence during the same clock cycle as the second PRU is configurable to transfer the first bit sequence from the first scratchpad register to the GPIO register.

17. An apparatus comprising:
   volatile memory;
   scratchpad registers;
   a first programmable real-time unit (PRU) coupled to the volatile memory and to the scratchpad registers, the first PRU configurable to transfer a bit sequence from the volatile memory to the scratchpad registers, the bit sequence comprising video data, clock data, and control information;
   a general purpose input output (GPIO) register; and
   a second PRU coupled to the scratchpad registers and to the GPIO register, the second PRU configurable to transfer the bit sequence to the GPIO register, the second PRU further configurable to produce a clock for a spatial light modulator (SLM) responsive to the clock data.

18. The apparatus of claim 17, further comprising a memory controller coupled to the volatile memory and adapted to be coupled to non-volatile memory, the memory controller configurable to transfer the bit sequence from the non-volatile memory to the volatile memory.

19. The apparatus of claim 17, further comprising the spatial light modulator, wherein the spatial light modulator is coupled to the GPIO register and configurable to produce an image responsive to the bit sequence at the GPIO register.

20. The apparatus of claim 19, wherein the spatial light modulator is directly connected to the GPIO register.

* * * * *